May 18, 1926.
E. A. LUNDVALL
POCKET TIRE GAUGE
Filed Jan. 5, 1924
1,585,398
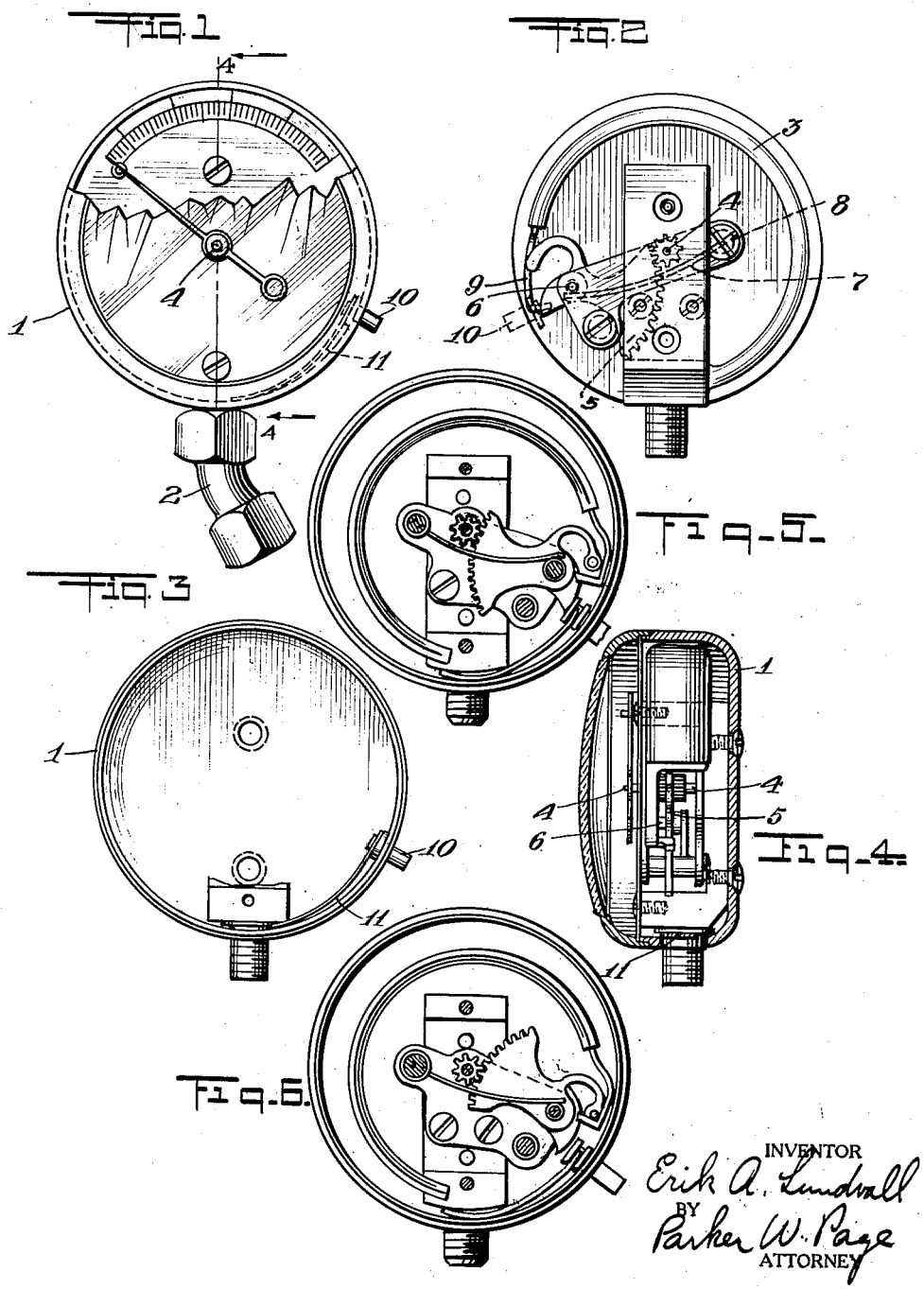

Patented May 18, 1926.

1,585,398

UNITED STATES PATENT OFFICE.

ERIK A. LUNDVALL, OF GRANTWOOD, NEW JERSEY, ASSIGNOR TO UNITED STATES GAUGE COMPANY, OF NEW YORK, N. Y., A CORPORATION OF PENNSYLVANIA.

POCKET TIRE GAUGE.

Application filed January 5, 1924. Serial No. 684,481.

In this application for Letters Patent of the United States I shall describe and claim certain improvements which I have made in a pocket test gauge which has been on the market for several years and which is now well known. This gauge is designed and used mainly to indicate the pressure of air pumped into automobile tires and is in the form of a watch with means for attaching it to the pump or air passage from the same into the tire, and contains a Bourdon tube that moves a pivoted sector which in turn engages with the pinion of a pointer that indicates the pressure on a scale. These parts are so arranged that the pointer remains in the position which indicates the highest pressure until it is reset or returned to zero by some form of resetting device.

Both practical experience and considerations of economy and efficiency of manufacture have demonstrated that the standard form of gauge thus generally described may be very greatly improved along the lines hereinafter indicated, and these improvements, as I have designed and applied them, constitute the subject of this application.

The main improvement is in the means for controlling the position of the sector and pointer, independently of the movement of the Bourdon spring or tube. In other words, while the sector should be as nearly as possible free to be moved from and to any given position, it should be adapted to remain in any position to which it may be brought by the Bourdon tube, even though subjected to shocks or jars. For this purpose I place a curved spring in a convenient position and cause its free end to bear against the pivotal spindle which carries the sector.

Again, after the sector and pointer have been set to indicate the pressure, the means for resetting both to zero position should be extremely simple and effective, and for this purpose I secure a long spring to a given point on the inside of the peripheral portion of the casing and cause it to act or impinge upon a pin or plug set in and extending out through the casing, so that it is normally held in inoperative position by the spring and is immediately restored to such position after it has been forced in and against the moved sector to return the latter and the pointer to zero position.

In one other respect I have simplified the construction of the instrument by providing the free end of the Bourdon tube with a solid projecting hook and arranging it in such relation to the sector that when under pressure and expanding it will pull the sector to a position corresponding to the pressure and be entirely free to leave it in such position when the pressure falls.

These improvements are illustrated in the accompanying drawings in which:—

Fig. 1 is a view of the gauge in side elevation.

Fig. 2 is a view in elevation of the interior working parts.

Fig. 3 is a view of the casing showing a spring attached thereto; and,

Fig. 4 is a section on line 4—4 of Fig. 1.

Figs. 5 and 6 are top plan views, with the pointer and scale removed, showing the positions of the parts before and after resetting.

As I have above intimated, the gauge as a whole is not of my invention. It comprises a casing 1 having a tubular extension 2 by which it is attached to whatever device the pressure in which is to be indicated. A Bourdon tube or spring 3 is connected to this part and when subjected to pressure its free end moves outwardly and upwardly in proportion to such pressure.

A central spindle 4 carries a pointer and a pinion and with the latter engages a toothed sector 5 pivotally mounted on a spindle 6, the sector and its spindle being mounted in the usual or any convenient way well known in the art. The movement of the sector with its spindle is restrained by a spring 7 secured to a post or spindle 8, the free end of said spring being properly bent and caused to bear upon the sector spindle as shown. This produces just sufficient friction on the spindle to prevent its free or independent movement, but not enough to sensibly interfere with its movement to any position under the influence of the Bourdon spring.

The end of the Bourdon spring 3 has a solid hook 9 projecting therefrom which when the spring is subjected to pressure, engages and moves the sector in proportion to such pressure, and from the above it will be understood that the pointer is left on the diminution or release of the pressure at the point which indicates the highest pressure attained.

To reset the pointer and sector, a pin 10 is inserted in a radial opening in the casing 1, with any proper precautions to prevent its falling out of the same, such, for example, as providing the pin with an enlarged head on the end thereof located within the casing, as shown in Fig. 3, or securing its inner end to the spring 11, or both. A light spring 11 is secured to the inner periphery of the casing and bent so as to lie along its inner wall and to press outwardly or towards this wall. This spring engages the inner end of the pin 10 or acts upon it to maintain it in its inoperative position. When the pin is pushed in to reset the device it engages and turns the sector to its normal or zero position, but it is immediately restored to its own normal position by the spring as soon as the pressure upon it is relieved.

The positions of the parts before and after re-setting are indicated in Figs. 5 and 6. Fig. 5 represents the positions of the parts after the pointer has registered, and the Bourdon tube with its hooked end has returned to its normal position, with the flat friction spring 7 bearing on the spindle 6 and preventing its rotation, thereby holding the spindle 4 stationary through its pinion and the sector 5. The cam edge by which the pin 10 moves the sector for re-setting now rests against the head of the pin, or, at a lower pressure, has approached it. To reset the pointer, the pin 10 is pushed in, its head engaging the cam and causing it and the sector to rotate about the spindle 6, thus, through the sector teeth and pinion, rotating the main spindle 4 and re-setting the pointer. This movement also brings the sector pin against the Bourdon hook, so that the device will now register a new pressure.

The object gained by the above described improvements is that, without enlarging, but on the other hand reducing, the dimensions of the device, the primary purposes of the instrument are secured in a better manner than by the former construction. It is greatly simplified and the number of required parts reduced.

What I claim is:

1. In a gauge of the character described, the combination with a Bourdon tube having a hooked end, a pivotally mounted sector with which the hooked end of the tube engages and by which it is moved when the tube is subjected to pressure, a pointer adapted to be moved over a scale by the movements of the sector, means for restraining the sector against free independent movement and means for resetting it after movement to zero or normal position, said last-named means including a resetting pin and a flat spring associated therewith and lying along the inner peripheral wall of said casing and normally acting to hold said pin in inoperative position.

2. In a gauge of the character described, the combination with a casing having therein a pointer and pivoted sector for moving the same to a position corresponding to the pressure which causes the forward movement of the sector, a movable resetting pin adapted to engage and move the sector back to its normal or zero position set in the peripheral wall of the casing, a flat spring secured to the inner wall and lying along the same and engaging with or acting upon the pin and adapted to maintain it in inoperative position and means for attaching said flat spring inside of said casing.

3. In a gauge of the character described, the combination with a pointer movable over a scale and mounted on a spindle provided with a pinion, a pivoted sector engaging with said pinion, a Bourdon tube the free end of which is formed with a projecting hook which engages with and moves the sector when the tube is subjected to pressure, a curved spring fixed in the casing and having its free end pressing upon the sector pivot, a resetting pin for returning the pointer and sector to zero position and a flat spring in said casing lying along the inner wall thereof and having one end fixed therein and its other end in engagement with said resetting pin inside of said casing and acting normally to hold said resetting pin in inoperative position.

In testimony whereof I hereto affix my signature.

ERIK A. LUNDVALL.